(12) United States Patent
Karp

(10) Patent No.: US 10,218,668 B1
(45) Date of Patent: Feb. 26, 2019

(54) DETECTION AND MODIFICATION OF OBSOLETE MESSAGES

(71) Applicant: Amazon Technologies, Inc., Reno, NV (US)

(72) Inventor: Samuel Benjamin Karp, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1092 days.

(21) Appl. No.: 13/744,642

(22) Filed: Jan. 18, 2013

(51) Int. Cl.
*H04L 12/58* (2006.01)

(52) U.S. Cl.
CPC .................................. *H04L 51/34* (2013.01)

(58) Field of Classification Search
CPC ............................ G06F 8/73; G06F 2221/2137
See application file for complete search history.

(56) References Cited

U.S. PATENT DOCUMENTS

| | | | | |
|---|---|---|---|---|
| 8,316,315 B2* | 11/2012 | Portnoy | ............... | G06Q 10/107 715/764 |
| 2006/0001744 A1* | 1/2006 | Singh | ................ | H04N 1/00347 348/207.99 |
| 2007/0011258 A1* | 1/2007 | Khoo | .................... | G06F 3/0482 709/206 |
| 2008/0045253 A1* | 2/2008 | Mousseau | ......... | G06F 17/30578 455/466 |
| 2009/0158441 A1* | 6/2009 | Mohler | ................. | G06F 21/552 726/27 |
| 2010/0146056 A1* | 6/2010 | Consul | .................... | H04L 51/22 709/206 |
| 2010/0250579 A1* | 9/2010 | Levow | ................. | G06Q 10/107 707/769 |
| 2010/0287249 A1* | 11/2010 | Yigang | ................ | G06Q 10/107 709/206 |
| 2010/0312621 A1* | 12/2010 | Abdulhayoglu | ... | G06Q 30/0241 705/14.4 |
| 2011/0047228 A1* | 2/2011 | Balasaygun | ............ | G06F 9/543 709/206 |
| 2012/0214444 A1* | 8/2012 | McBride | ............. | H04L 63/0807 455/411 |
| 2013/0024525 A1* | 1/2013 | Brady | ..................... | G06Q 10/08 709/206 |
| 2013/0297524 A1* | 11/2013 | Lau | ......................... | G06Q 10/00 705/333 |

* cited by examiner

Primary Examiner — Kevin T Bates
Assistant Examiner — Lesa M Kennedy
(74) Attorney, Agent, or Firm — Thomas | Horstemeyer, LLP (57) ABSTRACT

Disclosed are various embodiments relating to the creation, tracking, and modification of electronic messages that may become obsolete or irrelevant to the message recipient after a specific time or occurrence of an event. Upon detection of an event, the message may be altered so that the message recipient is not burdened by obsolete or irrelevant messages. The alteration may include moving to another folder, changing the appearance, deletion, and/or any other alteration that would reflect that the message is longer valid.

23 Claims, 5 Drawing Sheets

DETECTION AND MODIFICATION OF OBSOLETE MESSAGES

BACKGROUND

Consumers frequently receive electronic messages informing them of deals and/or events relating to particular products, services, etc. Since consumers may receive information from multiple merchants and/or the merchants provide multiple deals and/or events at a given time, the consumers may receive many electronic messages that may inundate their inbox. If the electronic messages are not accessed for a period of time, the consumer's inbox may become very inundated with the electronic messages.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to tracking and updating messages that become obsolete to the recipient at a particular time or upon the occurrence of an event. Consumers frequently receive messages informing them of deals or events relating to products, services, etc. While these messages are helpful in keeping the consumer informed, they can expire or become no longer valid or worth viewing following a certain time and/or occurrence of an event. This can become burdensome for individuals who do not access their messages over a period of time, and return to a large amount of messages, some of which may be rendered obsolete.

Various embodiments of the present disclosure facilitate the creation, tracking, and updating of time and/or event based messages such that when a message becomes obsolete, the message is altered in a way to avoid burdening the recipient with outdated or irrelevant information. In some embodiments, the messages are time-based. The time based messages may be created to include a start and end time relative to the message's contents. For example, if the message informs the user of a weekend sale. The end time would be the end of the weekend.

In some embodiments, the message may be based on an event, such as, for example, a shipping notice message. In the case of a shipping notice message, the ultimate delivery of the package that has been shipped would make the message obsolete since there is no longer a reason for the recipient to be concerned with a notice of the package's shipment. Additionally, the message may cause greater confusion for the recipient since they may think that another item has shipped.

Upon detection of the end time or occurrence of an event, the message may be altered, such as for example, in appearance, by deletion, by moving to another message folder, and/or any other approach to alter the message. Therefore, the recipient would not be burdened by obsolete or irrelevant messages when having to sort through a large number of received messages.

In the following discussion, a general description of the system and its components is provided, followed by a discussion of the operation of the same.

Figure 1:
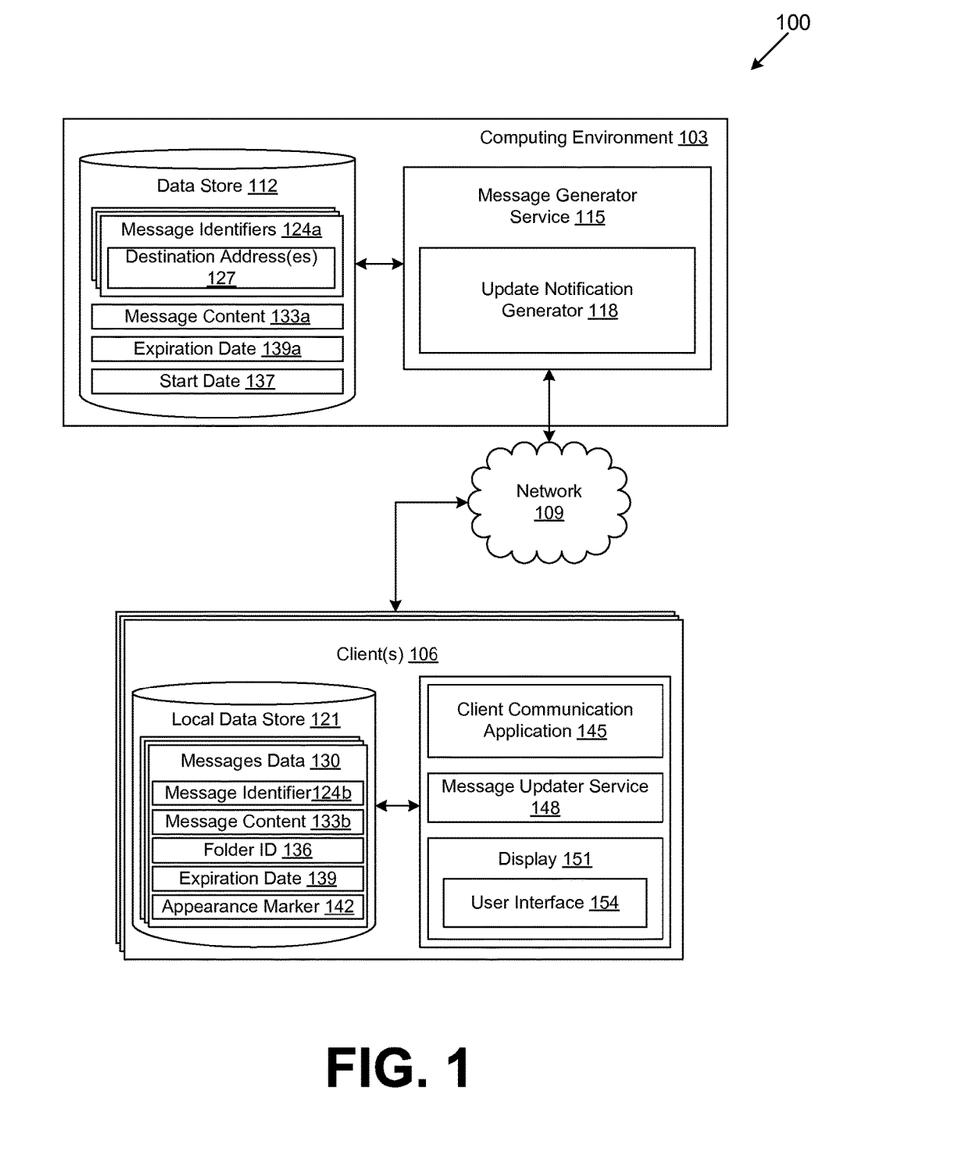
FIG. 1 is a drawing of a networked environment according to various embodiments of the present disclosure.

With reference to FIG. 1, shown is a networked environment 100 according to various embodiments. The networked environment 100 includes a computing environment 103 and a plurality of clients 106, which are in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a message generator service 115, an update notification generator 118, and other applications, services, processes, systems, engines, or functionality not discussed in detail herein. The message generator service 115 is executed to generate time and/or event based electronic messages. The electronic messages may include such as, for example, an email message, an instant message, a text message, a message embedded within a network page, mobile device notification, social media notification, or other type of message or notification that may be received within a computing device. The information within the messages generated by the message generator service 115 may become obsolete after a predefined period of time and/or upon the occurrence of an event. The update notification generator 118 is executed to track the occurrence of events or expiration dates. Upon detection of an event or expiration date, the update notification generator 118 generates and provides a notification to a client 106 with respect to the expiration or occurrence of an event associated with a particular message.

The data stored in the data store 112 includes, for example, message identifiers 124a, and potentially other data. The message identifiers 124a may be unique identifiers that correspond to at least one of the messages generated by the message generator service 115. Additionally, the message identifiers 124a may further comprise of destination address(es) 127. The destination addresses 127 may include destination message address, source message address, destination IP addresses, source IP address and/or other type of identifier that corresponds to the client 106 that received the message associated with the message identifier 124a.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 151. The display 151 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client communication application 145, a message updater service 148 and/or other applications. Also, various data is stored in the local data store 121 that is accessible to the client. The data stored in the local data store 121, for example, is associated with the operation of the various applications and/or functional entities described below.

The client communication application 145 may be executed in a client 106, for example, to access network content served up by the computing environment 103 and/or other servers, thereby rendering a user interface 154 on the display 151. The client communication application 145 may, for example, correspond to a browser, a mobile application, etc., and the user interface 154 may correspond to a network page, a mobile application screen, etc. The client 106 may be configured to execute applications beyond the client communication application 145 such as, for example, browsers, mobile applications, email applications, social networking applications, and/or other applications.

The data stored in the local data store 121 includes, for example, message data 130, and potentially other data. The message data 130 may comprise message content 133, a message identifier 124b, a folder ID 136, an expiration date 139, an appearance marker 142, and/or other information related to each message. The message content 133 includes the content of the message. For example, if the message is a shipping notice informing the recipient that a package has shipped, the message content 133 includes the shipment information.

The message identifier 124b includes an identifier that may be unique to the message and is used to identify a specific message. Folder ID 136 may be used in reference to identify a particular folder associated with the message when displayed by the client communication application 145. The expiration date 139 includes the date or time of reference for when the corresponding message will expire or become obsolete. The appearance marker 142 may include data relating to the appearance of the message as displayed on the user interface 154 employed by the client communication application 145. For example, unread email messages may displayed in bold text, read email messages are displayed in regular text, and obsolete email messages, either read or non-read, may be displayed in a lightened shade, patterned, or different color than the other non-obsolete messages.

Next, a general description of the operation of the various components of the networked environment 100 is provided. To begin, messages that are time and/or event based, such as, for example, deals or shipping notices, become irrelevant to the recipient following a particular predefined time or occurrence of an event. If the recipient fails to access their messages over a period of time for a variety of reasons, such as, for example, going on vacation, the recipient may return to find multiple messages in their inbox that are no longer relevant. For example, if a person is signed up to receive daily deals of products from a particular store, and they leave for a weeklong vacation, most of the deals will have expired when the individual returns from vacation. Having to sort through obsolete messages to determine timely and important messages can be both a burdensome and distracting.

In some embodiments, the message generator service 115 may create messages for a recipient. While the messages may be discussed as email messages, it should be noted that a message could be in any form of electronic message as discussed above. The message generator service 115 encodes the messages using the message content 133.

In other embodiments, the message generator service 115 may receive a message or group of messages from a third party and then generate a group of messages based on a list of recipients. For example, the message generator service 115 may receive a message(s) from merchant A including information regarding a weekend sale that merchant A wants to provide to its customers. The message generator service 115 may use the received message(s) from merchant A and merge a list email addresses corresponding to merchant A's customers. Accordingly, the message generator service 115 may then send the message to merchant A's customers.

The message generator service 115 may include in the header of the message information about the message including a message identifier 124, the source address, the destination address 127 and/or other information relating to the message. The message identifier 124 may be a unique number that the message generator service 115 creates to identify a specific message. The message identifier 124 may be based on a timestamp, the destination address 127, the source address, and/or other aspects related to the message. Additionally, the messages created by the message generator service 115 may be time or event based.

Time based messages typically have a start time and an end time for which the information included in the message remains relevant. For example, messages encoded with message content 133 that informs a consumer of certain product deals or sales are considered time based. The deal or sale may include a start date 137 and an expiration date 139. Once the deal or sale expires, the message becomes obsolete since the message content 133 is no longer valid. For example, the message may inform the user of a weekend sale starting a noon on Friday and ending at midnight on Sunday.

As such, the sale would no longer be occurring on the following Monday morning and the message would be considered obsolete.

To determine the time period of a time based message, the email generator service 115, may include the start date 137 and expiration date 139 in the header of the message. Therefore, by comparing the expiration date 139 contained in the header of the message with the current time, a system may determine whether a message is obsolete or still relevant.

Event based messages are messages that become obsolete upon the occurrence of a particular event. For example, an event based message may be a shipping notice. Assume that a consumer purchased a gift from an online retailer. Once the gift has shipped, the consumer will receive a message notifying the consumer of the shipment. However, once the gift has actually been delivered, the shipment notice is no longer relevant. As such, consumer may get confused in thinking that another shipment has been shipped if for whatever reason, they did not view the shipment message until after the package had already been delivered.

To determine whether an event has taken place that would render an event based message obsolete, a system associated with the message may have to receive some sort of notification from an external device that would have knowledge of the event. For example, if the external event is the delivery of the package, then the carrier service would send a delivery notification to the merchant notifying them of the delivery.

In another example, the event could merely be determined based on internal knowledge. For example, assume David is a subscriber to a social networking site which sends him notifications when his friends or colleagues take an action on the site. In order to receive notifications in a timely manner, David has configured his preferences such that he receives an email when an action by a friend or colleague has occurred. This email is an event based email. If David views the notification on the social networking site prior to viewing the email, the email message informing him of the action is no longer worth viewing since he has already learned of the action through the social networking site. Therefore, the event is his learning of the notification from the social networking site.

In some embodiments, the message generator service 115 sends the created message to a client 106. The message may be received by the client communication application 145 directly or through the message updater service 148 and stored relative to an inbox folder for newly received messages. Ultimately the client communication application 145 is used to display the message to a user through a user interface 154. Further, if the client 106 does not have a message updater service 148, the message generator service 115 may transmit the message updater service 148 to the client 106 for download so the time and event based messages generated by the message generator service 115 may be modified when obsolete or irrelevant.

In some embodiments, the update notification generator 118 may track the messages created by the message generator service 115. In one non-limiting example, for time based messages, the update notification generator 118 may monitor the expiration date associated with a sent message and upon detection of the occurrence of the expiration date, create a notification to transmit over the network 109 to a message updater service 148 executed on a client 106 associated with the transmitted message, notifying the message updater service 148 that the message has expired message.

In another non-limiting example, the update notification generator 118 may receive a confirmation notification of the occurrence of a particular event associated with a message (e.g. delivery of package). Upon receipt of the confirmation notification, the update notification generator 118 may create a notification for the message updater service 148 notifying the message updater service 148 that corresponding message is no longer worth viewing. For identification purposes, the notification created by the update notification generator 118 for both the time based and event based messages will include the message identifier 124 so that the message updater service can identify the obsolete message.

In other embodiments, the message updater service 148 executed on the client 106 may internally track the time based messages created by the message generator service 115. As such, the message updater service 148 does not need to wait for a notification from the update notification generator 118 informing it of the expiration date 139 of a message. For example, the message updater service 148 may monitor the expiration date 139 for each time based message and when the date has passed, it determines the message has expired. In some embodiments, the message updater service 148 may wait a predefined period of time following the detection of the expiration date 139 before considering the message obsolete or no longer worth viewing.

In some embodiments, the message updater service 148 may receive notifications from the update notification generator 118. The notifications received may notify the message updater service 148 of the passing of an expiration date 139 or the occurrence of an event. Based on the notification from the update notification generator 118 over the network 109, the message updater service 148 considers the associated message obsolete or no longer worth viewing. In some embodiments, the message updater service 148 may wait a predefined period of time following the detection of the expiration date 139 before considering the message obsolete or no longer worth viewing.

Upon determining that a message is obsolete or no longer worth viewing to the recipient, the message updater service 148 may interact with the client communication application 145 to alter the message as displayed on the user interface 154 associated with the client communication application 145. When a message is considered obsolete or no longer worth viewing, the message updater service 148 may take some sort of action with respect to the message. Such types of actions may include, for example, moving the message to another folder, deleting the message, changing the appearance of the message, modifying the message and/or some other type of action so that the recipient is not burdened by viewing messages that are no longer relevant to the recipient.

For example, assume Hannah is a subscriber to a deal site and receives daily messages containing deals she might be interested in purchasing. Hannah goes on vacation for a week, and does not have Internet access while she is away. During the week she is gone, her inbox fills up with deals that will be expired when she returns. For each expired message, the message updater service 148 will identify the message using the message identifier 124 and interact with the client communication application 145 to alter the state of the message.

For example, the message updater service 148 may request that the message be moved from Hannah's inbox folder to an expired/recalled messages folder. The message folder may be determined based on a folder ID 136 associated with the received message. As such, the message updater service 148 may modify the folder ID 136 to note the change of folder to display the message. Alternatively, the message updater service 148 may send a request to the client communication application 145 to change the folder associated with the message. In another non-limiting example, the message updater service 148 may delete the message or request the client communication application 145 to delete the message. This also may involve moving the message to the deleted item folder or actually deleting the message altogether.

In another non-limiting example, the message updater service 148 may alter the message by modifying the appearance of the message. This may be done by modifying the appearance marker 142 associated with the message. For example, typically a client communication application 145 may display on a user interface 154, an unread message in a boldface text. Alternatively, a read message may be displayed in a non-bold regular text. For an obsolete message, the message updater service 148 may modify the appearance marker 142 so that the client communication application 145 displays the message in a different color, shade, or pattern. For example, an obsolete message may be displayed with a gray-scale, lighter shaded and/or patterned text as shown in FIG. 2.

In another embodiment, the message updater service 148 may also be able to alter messages for period of time for messages that may be considered very important for a short period of time. Using the same concepts as discussed above with respect to obsolete message, a message may also be considered important. For example, assume that the message is a time-based message with a deal that only lasts for four hours. During the four hours of the deal, the message updater service 148 may interact with the client communication application to alter the message such that the recipient is drawn to the message on the display.

For example, the message updater service 148 may alter the appearance of the message such that the message is blinking when displayed on the user interface 154. Alternatively, in another non-limiting example, the message may be viewed in a bright color that would likely draw attention from the recipient. Further, the message updater service 148 may alter the message such that it is displayed in the top of the recipient's inbox for a predetermined time. Since there are many different ways to modify a message on display, the foregoing examples are merely non-limiting examples on how the message updater service 148 may alter a specific message.

Figure 2:
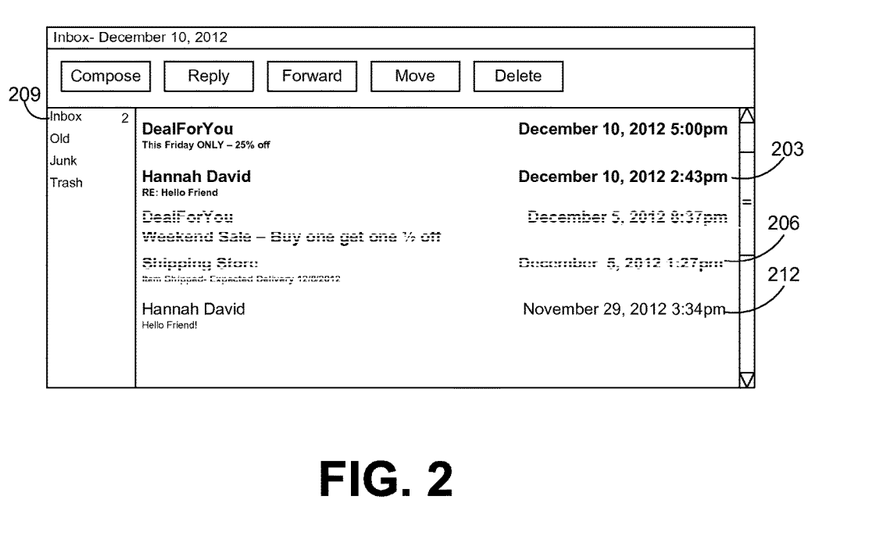
FIG. 2 is a drawing of an example of a user interface rendered by a client in the networked environment of FIG. 1 according to various embodiments of the present disclosure.

Referring next to FIG. 2, shown is an example of a user interface 154 (FIG. 1) rendered on a client 106 in the networked environment of FIG. 1 according to various embodiments of the present disclosure.

In particular, FIG. 2 depicts a non-limiting example of a client communication application 145 (FIG. 1) displaying multiple email messages displayed in the inbox folder 209. As illustrated, the user interface 154 may display the unread email messages 203 in a boldface text and the read email messages 212 in a regular text. Additionally, the obsolete emails 206 are displayed in a de-emphasizing appearance with a gray-scaled, patterned text. However, the obsolete emails 206 may be displayed in any type of appearance that is different from the standard messages to de-emphasize or emphasize a particular message. For example, the obsolete emails 206 may appear in a gray-scale text, different color text, patterned text, or any other appearance that alters the appearance.

In one non-limiting example, the DealsForYou message dated Dec. 5, 2012 informs the user of a weekend sale. This is an example of a time-based message with an expiration date at the end of the weekend. Assuming that the weekend sale started on December $6^{th}$ and ended at midnight on December $8^{th}$, the message informing the user of a deal would expire on December $9^{th}$. As shown in the example, the message is displayed in the gray-scale, patterned text, for example, so that the user is not drawn to the obsolete message.

In another non-limiting example, the ShippingStore message dated Dec. 5, 2012 informs the user of an item shipment with delivery expected for Dec. 8, 2012. This is an example of an event-based message which is obsolete upon the delivery of the package. Assuming that a notification of the shipment event has been received since the example of a user interface 154 shows that the current date is Dec. 10, 2012, the message is displayed in a patterned text, for example.

Figure 3:
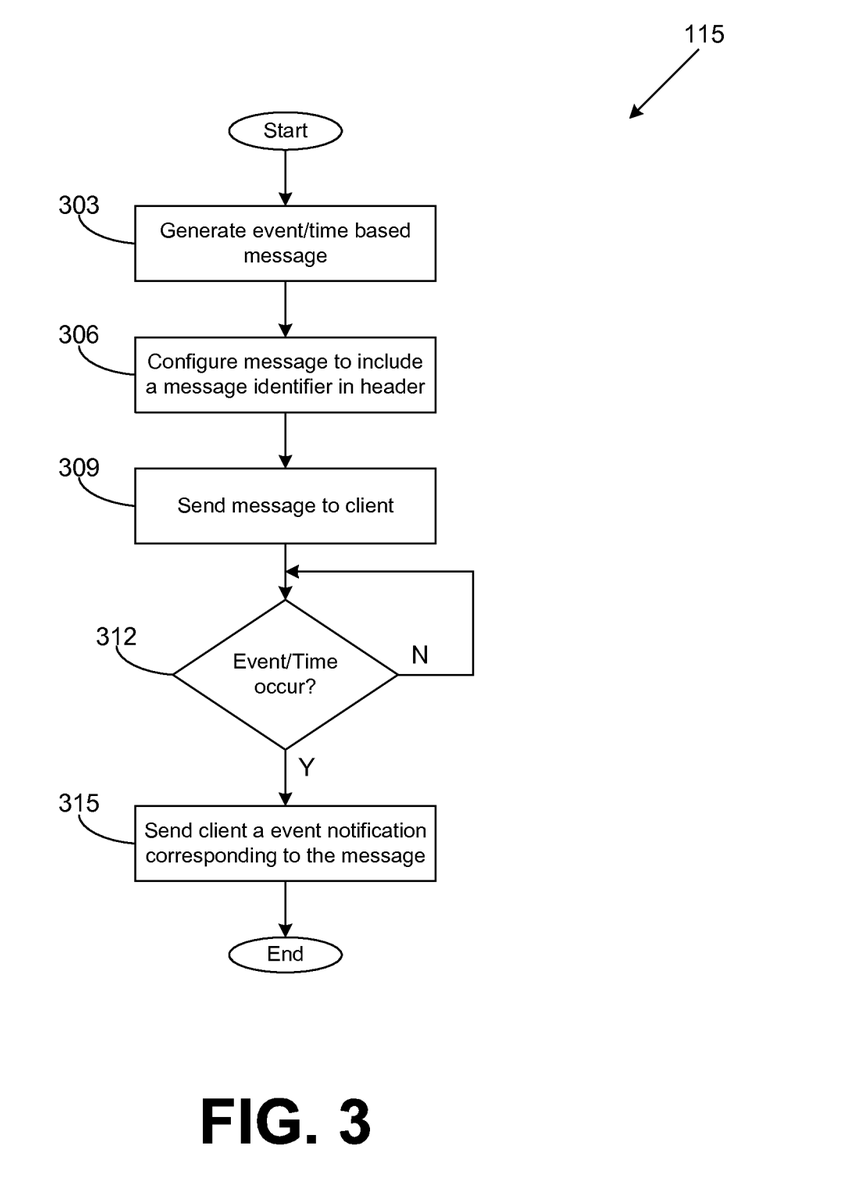
FIG. 3 is a flowchart illustrating one example of functionality implemented as portions of the message generator service executed in a computing environment in the networked environment of FIG. 1 according to various embodiments of the present disclosure.

Referring next to FIG. 3, shown is a flowchart that provides one example of the operation of a portion of the message generator service 115 according to various embodiments. It is understood that the flowchart of FIG. 3 provides merely an example of the many different types of functional arrangements that may be employed to implement the operation of the portion of the message generator service 115 as described herein. As an alternative, the flowchart of FIG. 3 may be viewed as depicting an example of steps of a method implemented in the computing environment 103 (FIG. 1) according to one or more embodiments.

FIG. 3 provides an example of the functionality that may be performed by the computing environment 103 when generating messages that may expire after a period of time or following an occurrence of an event. Upon the actual expiration or occurrence of the event associated with a message, a notification may be created and transmitted to the client device associated with the message.

Beginning with box 303, the message generator service 115 generates an event or time based message. As discussed above, a time based message is a message where the message content 133 is only relevant to the user for a particular period of time. An event based message is a message where the message content 133 is only relevant until the occurrence of a particular event. Regardless of whether the message is time or event based, the message generator service 115 generates the message and encodes the message with the message content 133. Alternatively, the message generator service 115 may merely generate a group of messages based on a message or groups of messages received from a third party by merging in the contact information from a list of intended recipients. After generating the event or time based message, the message generator service 115 proceeds to box 306.

In box 306, the message generator service 115 configures the message to include a message identifier 124 in the message's header. The message identifier 124 is a number that may be unique to the message and is used to identify the message at a later time. The message generator service 115 may generate the message identifier 124 based on a timestamp, the destination address 127, the source address and/or any other type of identifying factor associated with the message. Upon configuring the message to include a message identifier 124 the message generator service 115 proceeds to box 309.

In box 309, the message generator service 115 sends the message to a client device 106. Based on the designation address 127, the message is sent to the client. The message generator service 115 may also store the message identifier 124, destination address 127, expiration date 139 and/or any other information that may be referenced by the update notification generator 118 when a time has expired or event has occurred associated with the message. Upon sending the message to the client, the message generator service 115 interacts with the update notification generator and proceeds to box 312.

In box 312 the update notification generator 118 monitors, depending on the type of message, for the expiration time or event to occur. If the message is time-based, then the update notification generator 118 may monitor the expiration date 139 associated with the message. For example, assume the expiration date is midnight on December 22nd. As such, on December 22nd at midnight, the update notification generator 118 will detect that all message identifiers 124 with an expiration date 139 of midnight on December 22 have expired. However, the update notification generator 118 may also wait a predefined period of time after the expiration date 139 before determining that the date has expired.

If the message is event-based, the update notification generator 118 may receive a confirmation notification stating that a particular event has occurred associated with a message identifier 124. The confirmation notification may be received from an external device over the network 109 or may be generated within the computing environment 103. For example, the confirmation notification may be received from the package carrier notifying the update notification generator 118 that the package has been received. This notice would be related to the shipment message previously sent to the delivery recipient notifying them of the shipment. As such, delivery notification from the carrier serves as notice of an occurrence of an event that the shipment message is obsolete. However, in another non-limiting example, the confirmation notification may be internal to the same system that sent the original message. For example, a social media site that sends an email upon a friend's update as well as presenting the notification on the social media site. As soon as the user views the notification on the social media site, the message is obsolete and may be altered, deleted, and/or recalled.

If an event or expiration date has not occurred, the update notification generator 118 continues to monitor for the occurrence of an event or expiration date associated with the message. However, upon determining that the message is obsolete or no longer worth viewing, the update notification generator 118 proceeds to box 315.

In box 315 the update notification generator 118 sends a client an event notification corresponding to the message. The event notification is generated to include the message identifier 124 corresponding with the message that update notification generator 118 determined to be obsolete or no longer relevant to the recipient. After the event notification is generated, the update notification generator 118 sends it to the message updater service 148 executed on a client 106 informing the message updater service 148 that an event has occurred or expiration time has passed for the message with the corresponding message identifier 124. After sending the event notification to the client 106, the update notification generator 118 ends.

Figure 4:
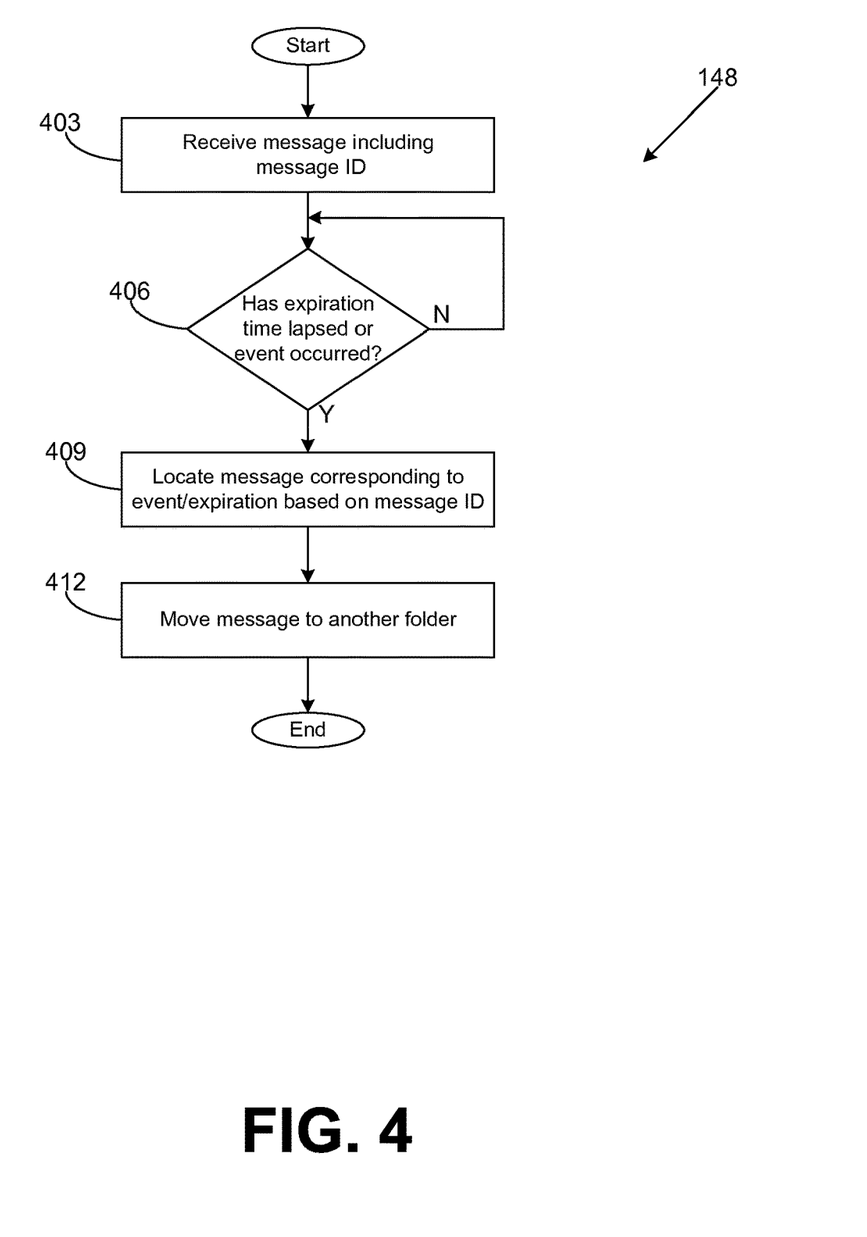
FIG. 4 is a flowchart illustrating one example of functionality implemented as portions of the message updater service executed in a client in the network environment of FIG. 1 according to various embodiments of the present disclosure.

Referring next to FIG. 4, shown is a flowchart that provides one example of the operation of a portion of the message updater service 148 according to various embodiments. It is understood that the flowchart of FIG. 4 provides merely an example of the many different types of functional arrangements that may be employed to implement the operation of the portion of the message updater service 148 as described herein. As an alternative, the flowchart of FIG. 4 may be viewed as depicting an example of steps of a method implemented in the client 106 (FIG. 1) according to one or more embodiments.

FIG. 4 provides an example of the functionality that may be performed by the client 106 when the message updater service 148 interacts with a client communication application 145 to modify the message based on the expiration of a time or an occurrence of an event associated with the message.

Beginning with box 403, the message updater service 148 receives a message with a corresponding message identifier 124 from the computing environment 103. The message updater service 148 may extract information from the message including the message identifier 124 from the header of the message. If the message is time based, the message updater service 148 may also extract the expiration date 139. The information may be used to track the message upon the occurrence of an event or passing of an expiration date 139. The message updater service 148 also interacts with a client communication application 145. The client communication application 145 may accessed by an individual to view the message through a user interface 154. Upon receiving the message with the message identifier 124, the message updater service 148 proceeds to box 406.

In box 406, the message updater service 148 determines whether an event has occurred. The event could be the passing of a particular time, (i.e. expiration date 139) or occurrence of another event that is associated with the message. If the message is a time-based message, the message updater service 148 may track the time to determine when the message expires or receive a notification from the computing environment 103 stating a message identified by the message identifier 124 has expired.

In one non-limiting example, the message updater service 148 may track the time by periodically checking the expiration date 139 contained in the header of the associated message 130 and upon detection that the expiration date is past the current date, determine that the time event occurred. In another non-limiting example, the message updater service 148 may log the expiration date 139 and message identifier 124, and monitor the time based on the log. For example, if the message updater service 148 knows that the message with message identifier 124 "X" has an expiration date of 2:30 pm on December 11th, on that date and time, the message updater service 148 will proceed accordingly.

In another non-limiting example, the message updater service 148 may receive a notification containing a message identifier 124 over the network 109 from the computing environment 103 which notifies the message updater service 148 that the corresponding message has expired. If the message updater service 148 has not received a notice or determined an occurrence of the event, the message updater service 148 remains at box 406 to until an event has occurred or time has passed. However, upon detection of an event or passing time associated with a message, the message updater service 148 proceeds to box 409.

In box 409, the message updater service 148 locates the message corresponding to the detected event. In one non-limiting example, the message updater service interacts with the client communication application 145 to find the particular message. Since the message identifier 124 is used to determine the appropriate message, the header of each message is evaluated until the matching message identifier is located. Alternatively, in another non-limiting example, the message updater service 148 may locate the message in the message data 130 by using the message identifier 124. Upon locating the message, the message updater service 148 proceeds to box 412.

In box 412, the message updater service 148 moves the message into another folder. In one non-limiting example, the message updater service 148 may change the corresponding folder ID 136 to reflect a different folder location. The folder ID 136 may be used by the client communication application 145 to determine the appropriate folder for the message. For example, the message updater service 148 may change the folder ID 136 from corresponding with the inbox folder to correspond with the expired or recalled messages folder. In another non-limiting example, the message updater service 148 may interact with the client communication application 145 and request the client communication application 145 modify the folder in which the message is displayed. It should be noted that although this step moves the message to a different folder, the message updater service 148 may alter the message in additional or alternative ways as described above. Upon moving the message to another folder, the message updater service 148 ends.

Figure 5:
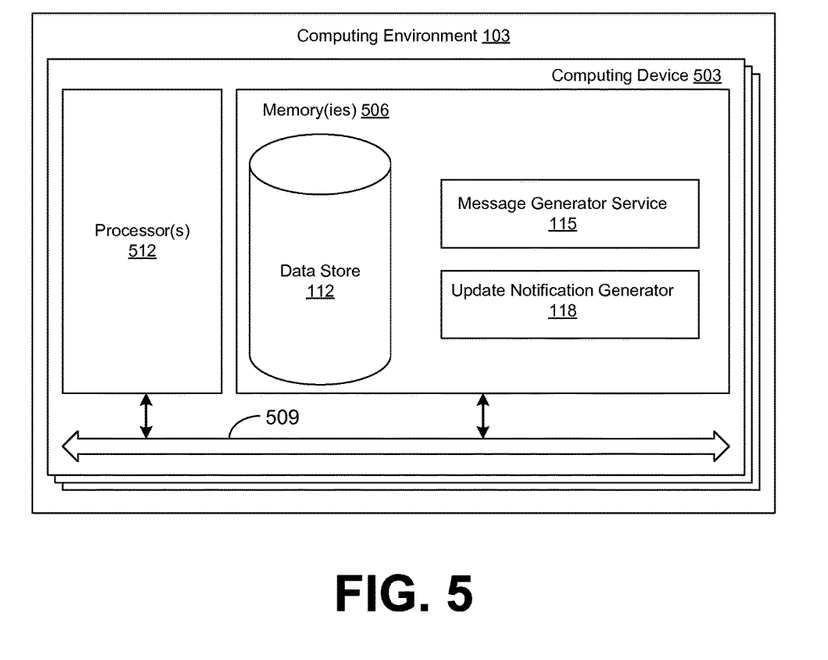
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 503. Each computing device 503 includes at least one processor circuit, for example, having a processor 512 and a memory 506, both of which are coupled to a local interface 509. To this end, each computing device 503 may comprise, for example, at least one server computer or like device. The local interface 509 may comprise, for example, a data bus with an accompanying address/control bus or other bus structure as can be appreciated.

Stored in the memory 506 are both data and several components that are executable by the processor 512. In particular, stored in the memory 506 and executable by the processor 512 are the message generator service 115, update notification generator 118, and potentially other applications. Also stored in the memory 506 may be a data store 112 and other data. In addition, an operating system may be stored in the memory 506 and executable by the processor 512.

It is understood that there may be other applications that are stored in the memory 506 and are executable by the processor 512 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 512. In this respect, the term "executable" means a program file that is in a form that can ultimately be run by the processor 512. Examples of executable programs may be, for example, a compiled program that can be translated into machine code in a format that can be loaded into a random access portion of the memory 506 and run by the processor 512, source code that may be expressed in proper format such as object code that is capable of being loaded into a random access portion of the memory 506 and executed by the processor 512, or source code that may be interpreted by another executable program to generate instructions in a random access portion of the memory 506 to be executed by the processor 512, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 512 may represent multiple processors 512 and/or multiple processor cores and the memory 506 may represent multiple memories 506 that operate in parallel processing circuits, respectively. In such a case, the local interface 509 may be an appropriate network that facilitates communication between any two of the multiple processors 512, between any processor 512 and any of the memories 506, or between any two of the memories 506, etc. The local interface 509 may comprise additional systems designed to coordinate this communication, including, for example, performing load balancing. The processor 512 may be of electrical or of some other available construction.

Although the message generator service 115, updated notification generator 118, message updater service 148 (FIG. 1) and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the message generator service 115, update notification generator 118, and message updater service 148. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 512 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the message generator service 115, update notification generator 118, and email updater service 148, that comprises software or code can be embodied in any non-transitory computer-readable medium for use by or in connection with an instruction execution system such as, for example, a processor 512 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   an email updater service executable in the at least one computing device, wherein, when executed, the email updater service causes the at least one computing device to at least:
   receive an email message from an email server, a content of the email message including displayable information about an occurrence of an event that is active during a first predefined period of time, the displayable information configured to be presented on a rendered version of the email message on a display of the at least one computing device;
   send a first instruction to a client email application to alter an appearance of the email message prior to a start of the first predefined period of time as displayed on a user interface associated with an email folder including the email message; and
   send a second instruction to the client email application to alter the appearance of the email message following an end of the first predefined period of time; and
   the client email application executable in the at least one computing device, wherein when, executed, the client email application causes the at least one computing device to at least:
   render the user interface such that the email message is displayed in an original form prior to the first predefined period of time;
   modify the user interface in response to receiving the first instruction, the user interface being modified such that the email message is displayed in at least one of: a different color, a different shade, or a different pattern;
   determine that the first predefined period of time has lapsed in response to receiving the second instruction; and
   modify, after a second predefined period of time following an ending of the first predefined period of time, the user interface such that the email message is displayed in the original form.

2. The system of claim 1, wherein the email message is configured to include a header comprising a message identifier.

3. The system of claim 1, wherein upon the occurrence of the event, the displayable information becomes obsolete with respect to a recipient of the email message.

4. The system of claim 2, wherein the email updater service further causes the at least one computing device to at least:
   receive an event notification, the event notification including the message identifier; and
   determine that the event has occurred based at least in part on the event notification.

5. The system of claim 1, wherein the email updater service further causes the at least one computing device to at least:
   periodically monitor whether an expiration date associated with the email message has occurred; and
   determine that the event has occurred based at least in part on whether the expiration date has occurred.

6. The system of claim 1, wherein the event is determined to have occurred upon a predetermined time following an expiration date associated with the email message.

7. The system of claim 1, wherein, when executed, the email updater service further causes the at least one computing device to instruct the client email application to move the email message to an expired messages folder.

8. The system of claim 1, wherein, when executed, the email updater service further causes the at least one computing device to instruct the client email application to delete the email message.

9. A method, comprising:
  receiving, by at least one computing device, a first message from a third-party client device associated with a third-party entity;
  determining, by the at least one computing device, a list of recipients associated with the third-party client device;
  generating, by the at least one computing device, a plurality of second messages based at least in part on the first message, individual second messages of the plurality of second messages corresponding to a respective recipient within the list of recipients associated with the third-party entity, the individual second messages being encoded with displayable information detailing an event that is to occur during a particular time period, the displayable information being configured to be presented on a rendered version of a respective second message via a display on a respective recipient client device associated with the respective recipient, and the individual second messages being relevant only during the particular time period of the event;
  transmitting, by the at least one computing device, the plurality of second messages to a plurality of recipient client devices; sending, by the at least one computing device, executable code to the plurality of recipient client devices, the executable code being configured to:
    interact with a communication application on the respective recipient client device; and
    modify an appearance of the rendered version of a respective second message following a predefined period of time, the appearance of the rendered version being modified by changing at least one of a color, a pattern, or a shade;
  detecting, by the at least one computing device, that the event associated with the plurality of second messages has occurred based at least in part on the particular time period;
  generating, by the at least one computing device, an update notification including information indicating that the event has occurred and a message identifier; and
  transmitting, by the computing device, the update notification to the plurality of recipient client devices.

10. The method of claim 9, wherein the update notification includes a message identifier.

11. The method of claim 9, wherein the event is based at least in part upon an expiration date associated with the plurality of second messages.

12. The method of claim 9, wherein detecting the event further comprises receiving, by the at least one computing device, an event notification from a third-party client device relating to the occurrence of the event.

13. The method of claim 9, wherein the plurality of second messages are generated to include a message identifier.

14. The method of claim 13, further comprising generating, by the at least one computing device, the message identifier based at least in part on a timestamp.

15. The method of claim 13, wherein the message identifier is unique to the plurality of second messages.

16. The system of claim 1, wherein the event comprises at least one of an item delivery or an item shipment.

17. The system of claim 2, wherein the message identifier comprises at least one of a timestamp, a destination address, or a source address.

18. The method of claim 13, wherein detecting that the event has occurred is based at least in part on determining that the particular time period has elapsed.

19. The method of claim 13, wherein the message identifier comprises at least one of a destination address or a source address.

20. The method of claim 9, wherein generating the plurality of second messages comprises merging the first message with a list of email messages associated with the list of recipients.

21. A non-transitory computer readable medium embodying a program executable in at least one computing device, wherein, when executed, the program causes the at least one computing device to at least:
  receive a first message from a third-party client device associated with a third-party entity;
  determine a list of recipients associated with the third-party client device;
  generate a plurality of second messages based at least in part on the first message, individual second messages of the plurality of second messages corresponding to a respective recipient within the list of recipients associated with the third-party entity, the individual second messages being encoded with displayable information detailing an event that is to occur during a particular time period, the displayable information being configured to be presented on a rendered version of a respective second message via a display on a respective recipient client device associated with the respective recipient, and the individual second messages being relevant only during the particular time period of the event;
  transmit the plurality of second messages to a plurality of recipient client devices;
  send executable code to the plurality of recipient client devices, the executable code being configured to:
    interact with a communication application on the respective recipient client device; and
    modify an appearance of the rendered version of a respective second message following a predefined period of time, the appearance of the rendered version being modified by changing at least one of a color, a pattern, or a shade;
  detect that the event associated with the plurality of second messages has occurred based at least in part on the particular time period;
  generate an update notification including information indicating that the event has occurred and a message identifier; and
  transmit the update notification to the plurality of recipient client devices.

22. The non-transitory computer-readable medium of claim 21, wherein generating the plurality of second messages comprises merging the first message with a list of email messages associated with the list of recipients.

23. The non-transitory computer-readable medium of claim 21, wherein detecting that the event has occurred is based at least in part on determining that the particular time period has elapsed.

* * * * *